United States Patent
Kitahara (10) Patent No.: US 9,078,272 B2
(45) Date of Patent: Jul. 7, 2015

(54) BASE STATION AND CONTROL METHOD OF BASE STATION

(75) Inventor: Minako Kitahara, Osaka (JP)

(73) Assignee: KYOCERA Corporation, Kyoto (JP)

( * ) Notice: Subject to any disclaimer, the term of this patent is extended or adjusted under 35 U.S.C. 154(b) by 154 days.

(21) Appl. No.: 13/876,831

(22) PCT Filed: Sep. 28, 2011

(86) PCT No.: PCT/JP2011/005473
§ 371 (c)(1),
(2), (4) Date: Mar. 28, 2013

(87) PCT Pub. No.: WO2012/042872
PCT Pub. Date: Apr. 5, 2012

(65) Prior Publication Data
US 2013/0182678 A1    Jul. 18, 2013

(30) Foreign Application Priority Data

Sep. 28, 2010 (JP) ................. 2010-217514
Sep. 28, 2010 (JP) ................. 2010-217521

(51) Int. Cl.
*H04W 72/08*    (2009.01)
*H04W 48/08*    (2009.01)
(Continued)

(52) U.S. Cl.
CPC ......... *H04W 72/087* (2013.01); *H04L 5/0007* (2013.01); *H04L 5/0037* (2013.01); *H04L 5/0057* (2013.01); *H04L 5/006* (2013.01);
(Continued)

(58) Field of Classification Search
CPC .............. H04W 72/087; H04W 48/08; H04W 72/1226; H04W 88/08; H04L 5/0037; H04L 5/0057; H04L 5/006; H04L 5/0007

USPC .................................................. 370/328, 329
See application file for complete search history.

(56) References Cited

U.S. PATENT DOCUMENTS 8,279,772 B2    10/2012 Jersenius et al.
2007/0026810 A1 *  2/2007 Love et al. ............ 455/67.11
(Continued)

FOREIGN PATENT DOCUMENTS

JP    2008-236431 A    10/2008
WO    2009/045139 A1    4/2009

OTHER PUBLICATIONS

International Search Report; PCT/JP2011/005473; Dec. 20, 2011.
(Continued)

*Primary Examiner* — Brian D Nguyen
(74) *Attorney, Agent, or Firm* — Studebaker & Brackett PC (57) ABSTRACT

A base station dynamically changes a CQI report format of a communication terminal under control thereof. A base station 1 according to the present invention handles an OFDM system and includes a reception unit 10 configured to receive channel quality information and a QoS request from the communication terminal under control of the base station 1, a scheduler 21 configured to schedule, based on the channel quality information and the QoS request, transmission data and a subband for each communication terminal, a determination unit 22 configured to determine, based on the channel quality information and the QoS request, a channel quality information format that satisfies the QoS request from the communication terminal under control of the base station 1, and a transmission unit 30 configured to transmit an order to change to the channel quality information format to the communication terminal under control of the base station 1.

6 Claims, 5 Drawing Sheets

(51) Int. Cl.
*H04L 5/00* (2006.01)
*H04W 88/08* (2009.01)
*H04W 72/12* (2009.01)

(52) U.S. Cl.
CPC .............. *H04W48/08* (2013.01); *H04W 88/08* (2013.01); *H04W 72/1226* (2013.01)

(56) References Cited

U.S. PATENT DOCUMENTS

| | | | |
|---|---|---|---|
| 2007/0099647 A1* | 5/2007 | Lee et al. | 455/522 |
| 2007/0115796 A1* | 5/2007 | Jeong et al. | 370/203 |
| 2007/0189235 A1* | 8/2007 | Chandra et al. | 370/335 |
| 2007/0248041 A1* | 10/2007 | Seki | 370/328 |
| 2008/0117867 A1* | 5/2008 | Yin et al. | 370/329 |
| 2009/0059844 A1* | 3/2009 | Ko et al. | 370/328 |
| 2009/0209261 A1* | 8/2009 | Kuri et al. | 455/450 |
| 2010/0093287 A1 | 4/2010 | Higuchi et al. | |
| 2010/0202306 A1 | 8/2010 | Jersenius et al. | |
| 2012/0300716 A1 | 11/2012 | Jersenius et al. | |

OTHER PUBLICATIONS

3GPP TS 36.300 V8.12.0 (Mar. 2010); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

3GPP TS 36.213 V8.2.0 (Mar. 2008); 3rd Generation Partnership Project; Technical Specification Group Radio Access Network; Evolved Universal Terrestrial Radio Access (E-UTRA); Physical layer procedures (Release 8).

* cited by examiner

FIG. 1

BASE STATION AND CONTROL METHOD OF BASE STATION

CROSS REFERENCE TO RELATED APPLICATIONS

This application claims priority to and the benefit of Japanese Patent Application No. 2010-217514 (filed on Sep. 28, 2010) and Japanese Patent Application No. 2010-217521 (filed on Sep. 28, 2010), the entire contents of which are incorporated herein by reference.

TECHNICAL FIELD

Embodiments discussed herein relate to a base station and a control method of the base station, and to a base station that handles an OFDM system and a control method of the base station.

BACKGROUND

As a radio communication system between the base station and communication terminals, standards based on the OFDM (Orthogonal Frequency-Division Multiplexing) system such as LTE (Long Term Evolution) and UMB (Ultra Mobile Broadband) are known. In the OFDM system, a frequency band used for a radio communication is separated into a plurality of subbands. The base station, in transmitting data to the communication terminals that are under control of the base station itself, schedules a radio resource by assigning the data for the communication terminals to the subbands. The base station, in order to appropriately schedule, uses CQI (Channel Quality Indicator) reports received from the communication terminals The CQI report is a report of downlink radio quality of the communication terminal provided to the base station. The base station, based on the received CQI report, schedules the transmission data for the radio communication terminal to a frequency band with good radio quality, thereby improving downlink throughput (for example, see Non-Patent Documents 1, 2 listed below).

There are a variety of formats of the CQI report transmitted from the communication terminal to the base station. For example, the CQI report includes average radio quality of an entire frequency band, an average radio quality of each of the subbands and the like. A data size of the CQI report varies based on a CQI report format.

For example, when the CQI report includes the average radio quality of the entire frequency band alone, the data size of the CQI report is small, thus consumption of an uplink radio resource may be reduced. In this case, while an information quantity processed by the base station is small, the base station is not able to obtain the radio quality of each of the subbands from the average radio quality of the entire frequency band alone. Therefore, the base station may not be able to assign the communication terminal to the subband having good radio quality, failing to schedule for efficient use of the frequency.

Also, for example, when the CQI report includes the average radio quality of each of the subbands as well as the average radio quality of the entire frequency band, the data size of the CQI report becomes large, increasing consumption of the uplink radio resource. In this case, although the information quantity processed by the radio base station is increased, the base station may obtain the average radio quality of each of all subbands. Therefore, the base station may assign the communication terminal to the subband having good radio quality, enabling scheduling for efficient use of the frequency.

Non-Patent Document 1: 3GPP TS36.300 "11.5 CQI reporting for scheduling" Non-Patent Document 2: 3GPP TS36.213 "7.2 UE procedure for reporting channel quality indication (CQI), precoding matrix indicator (PMI) and rank indication (RI)"

SUMMARY

As described above, the consumption of the uplink radio resource and a scheduling load on the base station varies based on the CQI report format. However, little consideration has been given to a method for dynamically changing the CQI report format according to circumstances.

For example, when there are a small number of communication terminals under control of the base station, since there are a plenty of available subbands for communications, the base station does not necessarily need to strictly schedule in order to satisfy a QoS (Quality of Service) request from each communication terminal. However, there has been a problem that, once the CQI report is set at initial setting or the like, the CQI report format may not be dynamically changed even when the QoS request from each communication terminal may not be satisfied. Further, there is another problem that, for example, a communication terminal having a high priority may not transmit the CQI report including more information.

Accordingly, taking in consideration of such conditions, a base station capable of dynamically changing the CQI report format of the communication terminal under control thereof and the control method of the base station are provided.

In order to solve the above problems, a base station for handling an OFDM system according to a first aspect includes:

a reception unit configured to receive channel quality information and a QoS request from a communication terminal under control of the base station;

a scheduler configured to schedule, based on the channel quality information and the QoS request, transmission data and a subband for each communication terminal;

a determination unit configured to determine, based on the channel quality information and the QoS request, a channel quality information format satisfying the QoS request from the communication terminal under control of the base station; and a transmission unit configured to transmit an order to change to the channel quality information format to the communication terminal under control of the base station.

A second aspect is the base station according to the first aspect, wherein the scheduler, when the channel quality information includes average radio quality of an entire frequency band and average radio quality of at least one subband, performs scheduling based on a difference between the average radio quality of the entire frequency band and the average radio quality of the at least one subband.

In order to solve the above problems, a base station for handling an OFDM system according to a third aspect includes:

a reception unit configured to receive channel quality information from a communication terminal under control of the base station;

a scheduler configured to schedule, based on the channel quality information, transmission data and a subband for each communication terminal;

a determination unit configured to determine a channel quality information format according to priority of each communication terminal; and a transmission unit configured to transmit an order to change to the channel quality information format to each communication terminal A fourth aspect of the present invention is the base station according to the third aspect, wherein the scheduler, when the channel quality information includes average radio quality of an entire frequency band and average radio quality of at least one subband, performs scheduling based on a difference between the average radio quality of the entire frequency band and the average radio quality of the at least one subband.

Although apparatuses are used as solutions according to the present invention as described above, it should be understood that the present invention may also be substantialized by methods, programs and storage media storing the programs that substantively correspond to those apparatuses and hence these are included in a scope of the present invention.

For example, as a method substantializing the present invention, a control method of a base station for handling an OFDM system according to a fifth aspect includes steps for:

receiving channel quality information and a QoS request from a communication terminal under control of the base station;

scheduling transmission data and a subband for each communication terminal based on the channel quality information and the QoS request;

determining a channel quality information format satisfying the QoS request from the communication terminal under control of the base station based on the channel quality information and the QoS request; and transmitting an order to change to the channel quality information format to the communication terminal under control of the base station.

Also, as a method substantializing the present invention, a control method of a base station for handling an OFDM system according to a sixth aspect includes steps for:

receiving channel quality information from a communication terminal under control of the base station;

scheduling transmission data and a subband for each communication terminal based on the channel quality information;

determining a channel quality information format according to priority of each communication terminal; and transmitting an order to change to the channel quality information format to each communication terminal.

According to the embodiments discussed herein, the base station may dynamically change the CQI report format used by the communication terminal under control thereof.

DESCRIPTION OF EMBODIMENTS

Embodiments of the present invention will be described in detail with reference to the accompanying drawings.

(First Embodiment)

Figure 1:
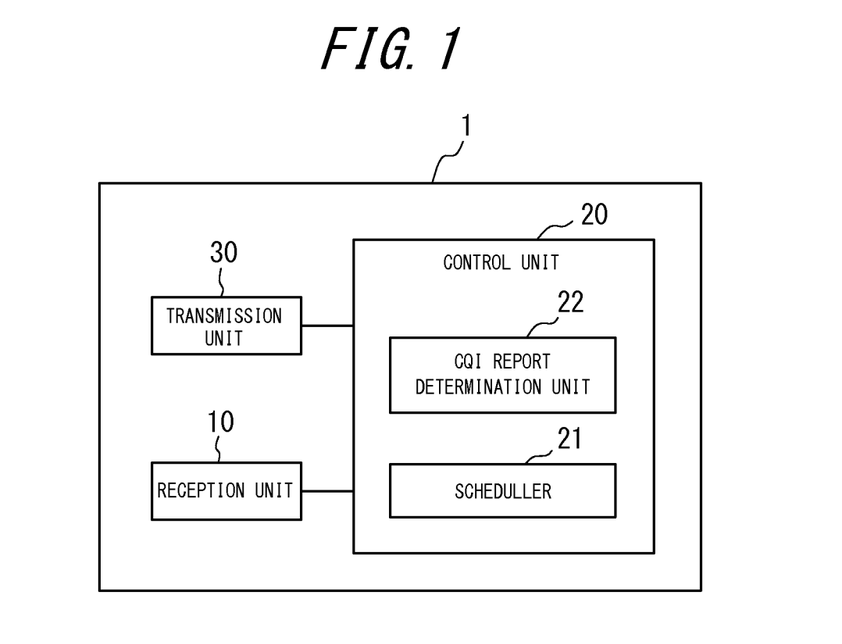
FIG. 1 is a diagram illustrating a schematic configuration of a base station according to a first embodiment.

FIG. 1 is a diagram illustrating a schematic configuration of a base station according to a first embodiment. A base station 1 includes a reception unit 10 configured to receive a CQI report (channel quality information) and a QoS request from a communication terminal (not illustrated) under control of the base station, a control unit 20 configured to control overall functions of the base station 1, and a transmission unit 30 configured to transmit data to the communication terminal. The control unit 20 includes a scheduler 21 for scheduling transmission data and a downlink subband for each communication terminal based on the CQI report and the QoS request received from the communication terminal, and a CQI report determination unit (determination unit) 22 for determining a CQI report format (channel quality information format) corresponding to the QoS request from the communication terminal under control of the base station.

In each embodiment, the following four CQI report formats are used between the base station 1 and the communication terminal.

Type 1: Average of Entire Band

A CQI report of an "average of entire band" format includes average radio quality of an entire frequency band (an average of the entire band) used for a downlink communication.

Type 2: Average of Entire Band and Average of Best Subband

A CQI report of an "average of entire band and average of best subband" format includes, in addition to the average radio quality of the entire frequency band, average radio quality (an average of a best subband) of a subband having best radio quality (the best subband) and an identifier indicating a position of the best subband.

Type 3: Average of Entire Band and Average of M Number of Subbands

A CQI report of an "average of entire band and average of M number of subbands" format includes, in addition to the average radio quality of the entire frequency band, average radio quality (average of M subbands) of top M number of subbands (M subbands) having best radio quality and identifiers indicating positions of the M number of subbands.

Type 4: Average of Entire Band and Average of All Subbands

A CQI report of an "average of entire band and average of all subbands" format includes, in addition to the average radio quality of the entire frequency band, average radio quality of each of all subbands.

Figure 2:
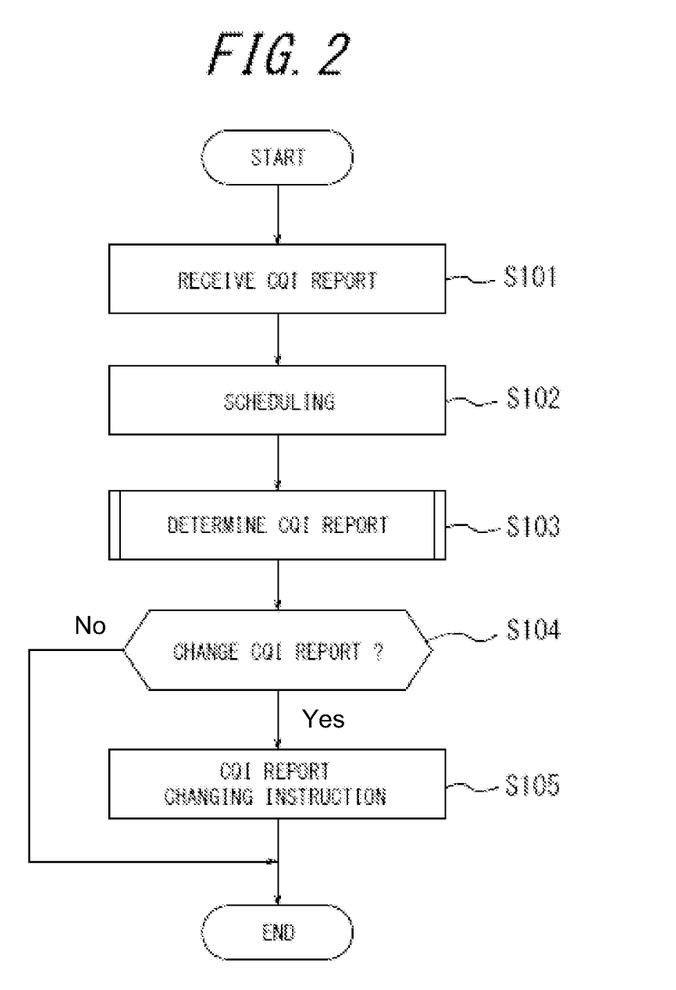
FIG. 2 is a flowchart illustrating an operation of the base station according to the first embodiment.

FIG. 2 is a flowchart of an operation of the base station 1 illustrated in FIG. 1. The reception unit 10, upon receiving the CQI report and the QoS request from the communication terminal under control of the base station thereof, supplies the CQI report and the QoS request to the scheduler 21 (step S101). The QoS request may be a CQI target level.

The scheduler 21, based on the CQI report and the QoS request supplied from the reception unit 10, schedules transmission data and downlink subbands in order to satisfy the QoS request from each communication terminal (step S102). The scheduler 21 performs scheduling in different manners according to the CQI report formats. The following is a detailed description of a scheduling operation of the scheduler 21 for each of the CQI report formats of types 1-4.

(Type 1: Average of Entire Band)

When the CQI report from each communication terminal is in the "average of entire band" format, the scheduler 21 performs scheduling on an assumption that the radio quality of each subband has the radio quality indicated by the "average of entire band". However, since some subbands may have the radio quality lower than the "average of entire band", the scheduler 21 may perform scheduling with a margin taken in consideration on an assumption that the radio quality of each subband is lower than the "average of entire band". The scheduler 21 assigns any subband to the communication terminal based on a data amount transmitted to the communication terminal Here, actual radio quality is different between each of the subbands. Therefore, the scheduler 21, by rotating the subbands assigned to the communication terminals within the entire frequency band, may average throughput to each communication terminal. That is, the scheduler 21, by rotating assignment of the subband, may average the throughput to each communication terminal without performing TPC (Transmission Power Control) control. Note that the scheduler 21, by performing the TPC control in addition, may further stabilize the throughput to each communication terminal.

(Type 2: Average of Entire Band and Average of Best Subband)

When the CQI report from each communication terminal is in the "average of entire band and average of best subband" format, the scheduler 21 performs scheduling by assigning each communication terminal to the "best subband" of each of the communication terminals When the best subbands of a plurality of communication terminals overlap with each other, the scheduler 21 performs scheduling by assigning the best subband to a communication terminal having a larger difference between the average of the entire band and the average of the best subband. This is because, when the difference between the average of the entire band and the average of the best subband is large, a necessary resource amount is different between when the transmission data is assigned to the best subband and when the transmission data is assigned to another subband. Since an efficient modulation class may be used for the subband having good radio quality, a large amount of data may be assigned to a small number of radio resources. On the other hand, since the efficient modulation class may not be used for a subband having mediocre radio quality, more radio resources are necessary for the same data amount. That is, the scheduler 21 may improve a user capacity by preferentially assigning the best subband to the communication terminal having a large difference between the average of the entire band and the average of the best subband. The scheduler 21 assigns other communication terminals, which are not assigned to the best subband, to other subbands. In this case, the scheduler 21, by rotating the subbands assigned to the communication terminals within the entire frequency band, may average the throughput to each communication terminal. Note that the scheduler 21, by performing the TPC control in addition, may further stabilize the throughput to each communication terminal.

(Type 3: Average of Entire Band and Average of M Number of Subbands)

When the CQI report from each communication terminal is in the "average of the entire band and average of M number of subbands" format, the scheduler 21 performs scheduling by assigning the communication terminals to any subband included in "M number of subbands" of each communication terminal. When the M subbands of a plurality of communication terminals overlap with each other, the scheduler 21 performs scheduling by preferentially assigning the M number of subbands to a communication terminal having a larger difference between the average of the entire band and the average of the M number of subbands. The scheduler 21 may improve the user capacity by preferentially assigning the subband included in the M number of subbands to the communication terminal having a larger difference between the average of the entire band and the average of the M number of subbands. The scheduler 21 assigns other communication terminals, which are not assigned to the M number of subbands, to other subbands. In this case, the scheduler 21, by rotating the subbands assigned to the communication terminals within the entire frequency band, may average the throughput to each communication terminal. Note that the scheduler 21, by performing the TPC control in addition, may further stabilize the throughput to each communication terminal.

(Type 4: Average of Entire Band and Average of All Subbands)

When the CQI report from each communication terminal is in the "average of entire band and average of all subbands" format, the scheduler 21 may obtain average radio quality of each subband for all of the communication terminals The scheduler 21 performs scheduling by preferentially assigning, to a communication terminal having a larger maximum value of a difference between the average of the entire band and the average radio quality of each subband, a subband that makes the difference maximum. Although a processing load on the scheduler 21 is increased by the CQI report in this format, an appropriate subband may be assigned to each communication terminal.

Figure 3:
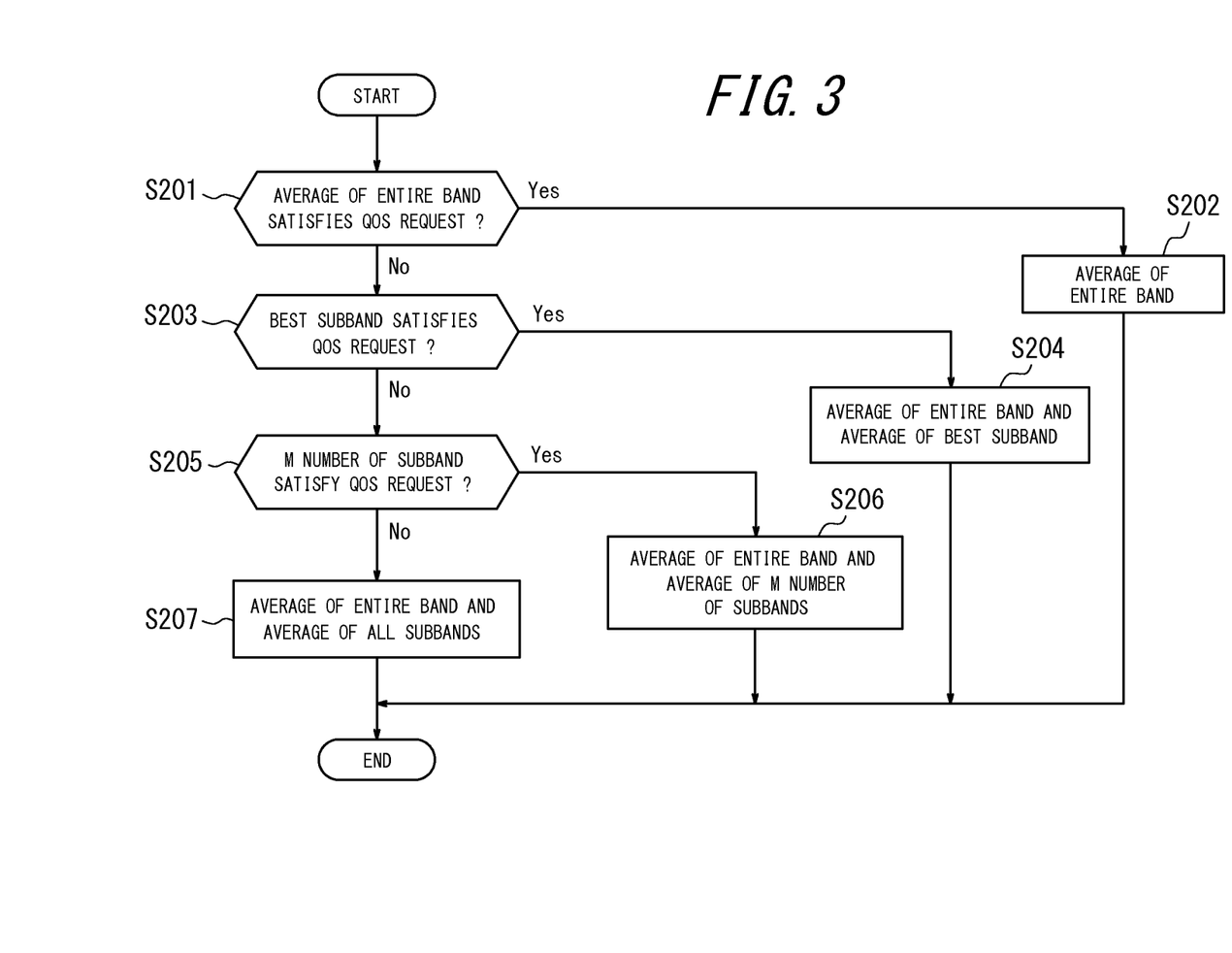
FIG. 3 is a flowchart illustrating a CQI report determination process in detail according to the first embodiment.

After scheduling by the scheduler 21, the CQI report determination unit 22 determines the CQI report format corresponding to the QoS request from the communication terminal under control of the base station thereof (step S103). FIG. 3 is a flowchart illustrating a CQI report determination process at step S103 in FIG. 2 in detail.

In the flowchart in FIG. 3, the CQI report determination unit 22 determines whether the QoS request received from each communication terminal may be satisfied by the CQI report of the "average of entire band" format (step S201). For example, when the number of communication terminals is relatively small and each of the communication terminals may secure a subband necessary for transmitting desired data without competing against each other, the CQI report determination unit 22 determines that the QoS request may be satisfied by the CQI report in the "average of entire band" format. When the QoS request may be satisfied by the CQI report in the "average of entire band" format, the CQI report determination unit 22 sets the "average of entire band" format as the CQI report format (step S202).

When the CQI report in the "average of entire band" format may not satisfy the QoS request, the CQI report determination unit 22 determines whether the QoS request from each communication terminal may be satisfied by the CQI report in the "average of entire band and average of best subband" format (step S203). For example, when the number of communication terminals is slightly increased, until best subbands of the communication terminals overlap with each other, scheduling may be performed by assigning the data to the best subband of each communication terminal. Therefore, the CQI report determination unit 22 determines that the CQI report in the "average of entire band and average of best subband" format may satisfy the QoS request. When the CQI report in the "average of entire band and average of best subband" format may satisfy the QoS request, the CQI report determination unit 22 sets the "average of entire band and average of best subband" format as the CQI report format (step S204).

When the CQI report in the "average of entire band and average of best subband" format may not satisfy the QoS request either, the CQI report determination unit 22 determines whether the QoS request received from each communication terminal may be satisfied by the CQI report in the "average of entire band and average of M number of subbands" format (step S205). For example, when the number of communication terminals is significantly increased, until an M number of subbands of a communication terminal overlap with an M number of subbands of another communication terminal, scheduling may be performed by assigning the data to any of the M number of subbands of each communication terminal Therefore, the CQI report determination unit 22 determines that the CQI report in the "average of entire band and average of M number of subbands" format may satisfy the QoS request. When the CQI report in the "average of entire band and average of M number of subbands" format may satisfy the QoS request, the CQI report determination unit 22 sets the "average of entire band and average of M number of subbands" format as the CQI report format (step S206).

When the CQI report in the "average of entire band and average of M number of subbands" format may not satisfy the QoS request either, the CQI report determination unit 22 sets the "average of entire band and average of all subbands" format as the CQI report format (step S208). That is, when the number of communication terminals is significantly increased, the CQI report in the "average of entire band and average of all subbands" format is used.

When the CQI report determined at step S103 is different from a current CQI report (Yes at step S104), the CQI report determination unit 22, from the transmission unit 30, transmits an order to change to the CQI report format determined at step S103 to the communication terminal under control of the base station thereof (step S105). Upon receiving the order, the communication terminal changes the CQI report format and transmits radio quality information in a changed CQI report format to the base station 1.

According to the present embodiment, as described above, the CQI report determination unit 22, based on the CQI report and the QoS request that are received, determines the CQI report format that satisfies the QoS requests for the number of communication terminals under control of the base station thereof and transmits the order to change to the CQI report in the format to the communication terminal. Thereby, the base station 1 may change the CQI report format used by all of the communication terminals based on the number of communication terminals under control thereof and satisfy the QoS request while preventing unnecessary increase in consumption of uplink radio resources. Also, a scheduling load on the base station may be adjusted based on the number of communication terminals under control of the base station itself.

According to the present embodiment, further, the scheduler 21, when the CQI report includes the average radio quality of the entire frequency band and average radio quality of at least one subband, performs scheduling based on a difference between the average radio quality of the entire frequency band and the average radio quality of the at least one subband. Thereby, the transmission data may be efficiently assigned to a small number of radio resources, thus improving the user capacity.

(Second Embodiment)

The base station 1 according to a second embodiment, in a manner similar to the first embodiment, includes the reception unit 10, the control unit 20 including the scheduler 21 and the CQI report determination unit (determination unit) 22, and the transmission unit 30. Here, the CQI report determination unit 22 according to the second embodiment determines the CQI report format (channel quality information format) according to priority of the communication terminal under control of the base station thereof.

Figure 4:
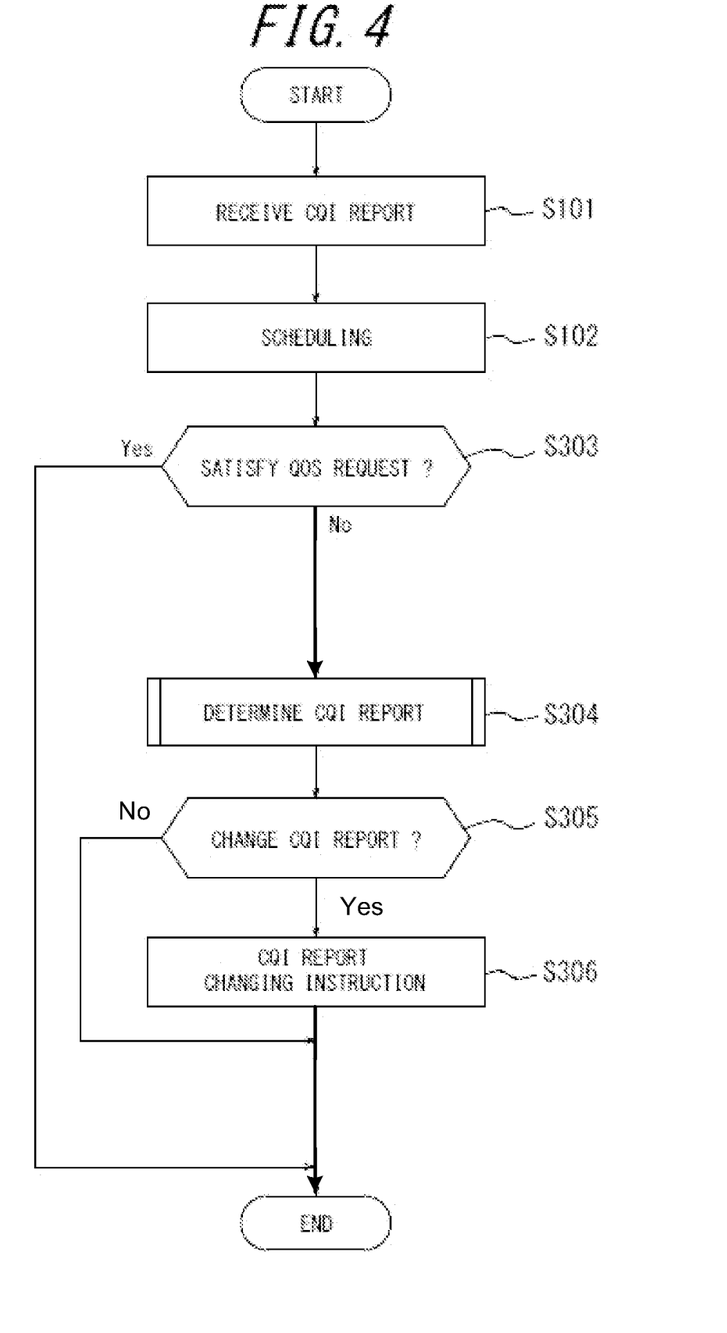
FIG. 4 is a flowchart illustrating an operation of the base station according to a second embodiment.

FIG. 4 is a flowchart of an operation of the base station 1 according to the second embodiment. Since processing by the base station 1 at steps S101 and S102 is the same as those according to the first embodiment, descriptions thereof will be omitted.

After step S102, the scheduler 21 determines whether a scheduling result satisfies the QoS request from each communication terminal (step S303). For example, when a plurality of communication terminals transmit the CQI reports in the "average of entire band and average of best subband" format and the best subbands of the communication terminals overlap with each other, the scheduler 21 may assign only one communication terminal to the best subband. The subbands satisfying the QoS requests may not possibly be assigned to the communication terminals to which the best subbands are not assigned. In such a case, the scheduler 21 may determine that the QoS request of each communication terminal is not satisfied. Also, when a plurality of communication terminals transmit the CQI reports in the "average of entire band and average of M number of subbands" format or the CQI reports in the "average of entire band and average of all subbands" format, if subbands having good radio quality overlap between a plurality of communication terminals and thus there is a communication terminal whose QoS request is not satisfied, the scheduler 21 may determine that the QoS request of each communication terminal is not satisfied.

Figure 5:
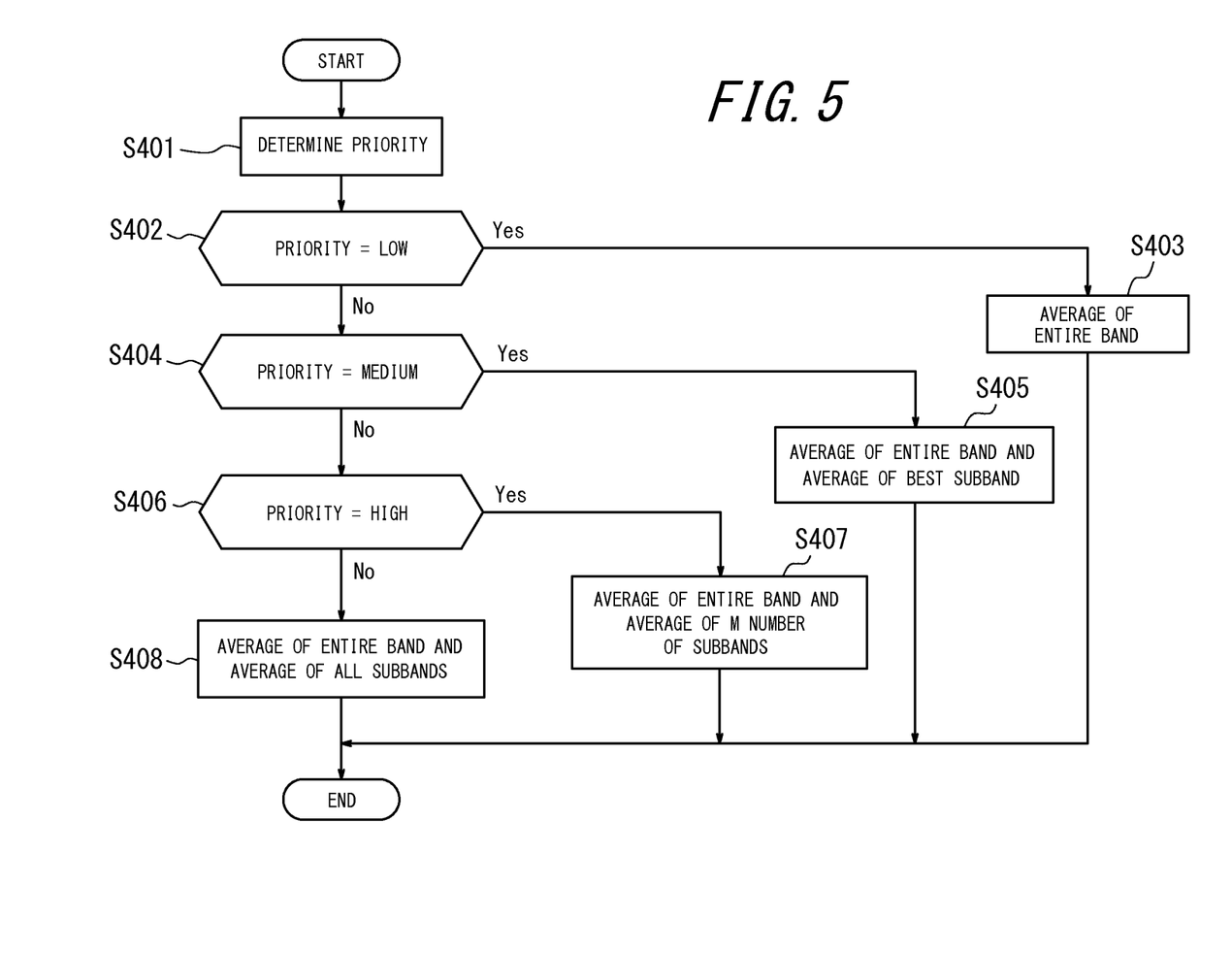
FIG. 5 is flowchart illustrating a CQI report determination process in detail according to the second embodiment.

When the scheduler 21 determines that the QoS request from each communication terminal is not satisfied (No at step S303), the CQI report determination unit 22 determines the CQI report format according to the priority of each communication terminal under control of the base station thereof (step S304). FIG. 5 is a flowchart illustrating a CQI report determination process at step S304 in FIG. 4 in detail.

In the flowchart in FIG. 5, the CQI report determination unit 22, based on the QoS request received from the communication terminal, first determines the priority of the communication terminal (step S401). The CQI report determination unit 22 may determine the priority of the communication terminal by, for example, accessing a subscription information management server (not illustrated) or the like and obtaining subscription information or the like of the communication terminal. Next, the CQI report determination unit 22 determines whether the communication terminal has a low priority (step S402). When the communication terminal has a low priority, the CQI report determination unit 22 sets the "average of entire band" format as the CQI report format (step S403). That is, the communication terminal having a low priority uses the CQI report in the "average of entire band" format, which is for a small amount of data.

When the communication terminal does not have a low priority, the CQI report determination unit 22 determines whether the communication terminal has a medium priority (step S404). When the communication terminal has a medium priority, the CQI report determination unit 22 sets the "average of entire band and average of best subband" format as the CQI report format (step S405). That is, the communication terminal having a medium priority uses the CQI report in the "average of entire band and average of best subband" format, which includes information about the best subband that may satisfy the QoS request.

When the communication terminal does not have a medium priority, the CQI report determination unit 22 determines whether the communication terminal has a high priority (step S406). When the communication terminal has a high priority, the CQI report determination unit 22 sets the "average of entire band and average of M number of subbands" format as the CQI report format (step S407). That is, the communication terminal having a high priority uses the CQI report in the "average of entire band and average of M number of subbands" format, which includes information about the M number of subbands that may satisfy the QoS request.

When the communication terminal does not have a high priority, the CQI report determination unit 22 sets the "average of entire band and average of all subbands" format as the CQI report format (step S408). That is, the communication terminal having an even higher priority than the high priority uses the CQI report in the "average of entire band and average of all subbands" format, which includes the most detailed information about the subbands.

When the CQI report determined at step S304 is different from the current CQI report (Yes at step S305), the CQI report determination unit 22 transmits, from the transmission unit 30, an order to change to the CQI report format determined at step S304 to the communication terminal under control of the base station thereof (step S306). Upon receiving the order, the communication terminal changes the CQI report format and transmits the radio quality information in a changed CQI report format to the base station 1. The processing at steps S304 to S306 is repeated as many times as the number of communication terminals.

According to the present embodiment, as described above, the CQI report determination unit 22 determines the CQI report format according to the priority of each communication terminal and transmits the order to change to the CQI report in the format. Thereby, the base station 1 may change the CQI report format based on the priority of the communication terminal under control thereof and satisfy the QoS request while preventing increase in unnecessary consumption of the uplink radio resources. Also, the scheduling load on the base station may be adjusted based on the number of communication terminals under control of the base station itself.

According to the present embodiment, further, the scheduler 21, when the CQI report includes the average radio quality of the entire frequency band and the average radio quality of at least one subband, performs scheduling based on the difference between the average radio quality of the entire frequency band and the average radio quality of the at least one subband. Thereby, the transmission data may be efficiently assigned to a small number of radio resources, thus improving the user capacity.

Although the present invention is described based on the figures and the embodiments, it is to be understood that those who are skilled in the art may easily vary or modify in a multiple manner based on disclosure of the present invention. Accordingly, such variation and modification are included in a scope of the present invention. For example, a function or the like of each unit or each step may be rearranged avoiding a logical inconsistency, such that a plurality of components or steps are combined or divided.

According to the second embodiment, for example, the base station obtains the QoS request from the communication terminal and, when the QoS request of each communication terminal is not satisfied, determines the CQI report format according to the priority of each communication terminal. However, the base station, without the QoS request from the communication terminal, may determine the CQI report format according to the priority of each communication terminal and transmit the order to change the CQI report format to each communication terminal.

Reference Signs List
1 communication terminal
10 reception unit
20 control unit
21 scheduler
22 CQI report determination unit
30 transmission unit

The invention claimed is:

1. A base station for handling an OFDM system, comprising:
 a reception unit configured to receive channel quality information and a QoS request from a communication terminal under control of the base station;
 a scheduler configured to schedule, based on the channel quality information and the QoS request, transmission data and a subband for each communication terminal;
 a determination unit configured to determine, based on whether the channel quality information satisfies the QoS request, a channel quality information format satisfying the QoS request from the communication terminal under control of the base station; and
 a transmission unit configured to transmit an order to change to the channel quality information format to the communication terminal under control of the base station.

2. The base station according to claim 1, wherein the scheduler, when the channel quality information includes average radio quality of an entire frequency band and average radio quality of at least one subband, performs scheduling based on a difference between the average radio quality of the entire frequency band and the average radio quality of the at least one subband.

3. A base station for handling an OFDM system, comprising:
 a reception unit configured to receive channel quality information from a communication terminal under control of the base station;
 a scheduler configured to schedule, based on the channel quality information, transmission data and a subband for each communication terminal; and
 a determination unit configured to determine a channel quality information format to satisfy a QoS request received from each communication terminal according to priority of each communication terminal; and
 a transmission unit configured to transmit an order to change to the channel quality information format to each communication terminal.

4. The base station according to claim 3, wherein the scheduler, when the channel quality information includes average radio quality of an entire frequency band and average radio quality of at least one subband, performs scheduling based on a difference between the average radio quality of the entire frequency band and the average radio quality of the at least one subband.

5. A control method of a base station for handling an OFDM system, comprising steps for:
 receiving channel quality information and a QoS request from a communication terminal under control of the base station;
 scheduling transmission data and a subband for each communication terminal based on the channel quality information and the QoS request;
 determining a channel quality information format satisfying the QoS request from the communication terminal under control of the base station based on whether the channel quality information satisfies the QoS request; and
 transmitting an order to change to the channel quality information format to the communication terminal under control of the base station.

6. A control method of a base station for handling an OFDM system, comprising steps for:
- receiving channel quality information from a communication terminal under control of the base station;
- scheduling transmission data and a subband for each communication terminal based on the channel quality information;
- determining a channel quality information format to satisfy a QoS request received from each communication terminal according to priority of each communication terminal; and
- transmitting an order to change to the channel quality information format to each communication terminal.

* * * * *